United States Patent
Hu et al.

(10) Patent No.: US 8,903,254 B2
(45) Date of Patent: Dec. 2, 2014

(54) LOW POWER CONSUMPTION, LONG RANGE, PLUGGABLE TRANSCEIVER, CIRCUITS AND DEVICES THEREFOR, AND METHOD(S) OF USING THE SAME

(75) Inventors: Zhaoyang Hu, Westlake Village, CA (US); Lingqiong Zeng, Chengdu (CN); Thomas Liljeberg, Chatsworth, CA (US)

(73) Assignee: Source Photonics, Inc., Chatsworth, CA (US)

( * ) Notice: Subject to any disclaimer, the term of this patent is extended or adjusted under 35 U.S.C. 154(b) by 514 days.

(21) Appl. No.: 13/114,431

(22) Filed: May 24, 2011

(65) Prior Publication Data
US 2012/0301151 A1 Nov. 29, 2012

(51) Int. Cl.
H04B 10/50 (2013.01)
H04B 10/40 (2013.01)
H01S 5/024 (2006.01)

(52) U.S. Cl.
CPC .................................... H04B 10/40 (2013.01)
USPC ...... 398/192; 398/136; 372/38.02; 372/38.04

(58) Field of Classification Search
USPC .......................................... 398/136, 192, 197
See application file for complete search history.

(56) References Cited

U.S. PATENT DOCUMENTS

| 4,972,425 | A | * | 11/1990 | Braski ............................. 372/32 |
| 5,930,022 | A | * | 7/1999 | Okuma .......................... 359/248 |
| 7,183,540 | B2 | | 2/2007 | Zhang et al. |
| 7,200,336 | B2 | | 4/2007 | Yu et al. |
| 7,650,077 | B2 | | 1/2010 | Yu et al. |
| 2008/0144678 | A1 | * | 6/2008 | Lu et al. ........................... 372/22 |
| 2008/0232813 | A1 | * | 9/2008 | Yutani ........................... 398/135 |
| 2008/0267620 | A1 | * | 10/2008 | Cole et al. ........................ 398/17 |
| 2009/0190617 | A1 | * | 7/2009 | Kikuchi ..................... 372/29.021 |
| 2011/0164885 | A1 | * | 7/2011 | Takei et al. .................... 398/192 |
| 2012/0082462 | A1 | | 4/2012 | Mariotti et al. |

OTHER PUBLICATIONS

Zhaoyang Hu, Hucheng Li, Anbin Wang and Meiling Lu; "Method, Circuitry and Apparatus for Outputting a Stable Optical Signal in a Dense Wavelength Division Multiplexing Device During Fast Changes of Operating Conditions"; U.S. Appl. No. 13/020,740, filed Feb. 3, 2011.

Zhaoyang Hu, Qing Xiao, Meiling Lu, Yan Chen and Thomas Liljeberg; "Tunable Dense Wavelength Division Multiplexing Transceiver, Circuits and Devices Therefor, and Methods for Making and Using Such Transceivers, Circuits and Devices"; U.S. Appl. No. 13/050,787, filed Mar. 17, 2011.

* cited by examiner

*Primary Examiner* — Nathan Curs
(74) *Attorney, Agent, or Firm* — Andrew D. Fortney; Central California IP Group, P.C.

(57) ABSTRACT

The present disclosure relates to an optical transceiver for use in optical fiber communications and/or telecommunications systems and, more specifically, a low power consumption, long range pluggable transceiver. The transceiver generally comprises a photodiode with a transimpedance amplifier (PIN-TIA); an electro-absorption modulated laser (EML); an optical detector; and a directly modulated laser (DML) driving module connected between the PIN-TIA and EML laser configured to drive the EML laser. A low power-consumption DML driving module is utilized to drive the EML laser, so as to further reduce power consumption. An impedance matching circuit can be applied to modulate an electro-absorption (EA) modulator of the EML laser with maximum efficiency.

20 Claims, 4 Drawing Sheets

LOW POWER CONSUMPTION, LONG RANGE, PLUGGABLE TRANSCEIVER, CIRCUITS AND DEVICES THEREFOR, AND METHOD(S) OF USING THE SAME

FIELD OF THE INVENTION

The present invention generally relates to the field of optoelectronic conversion devices (e.g., optical transceivers) in fiber optic communications and telecommunications. More specifically, embodiments of the present invention pertain to a long range, low power, small form-factor pluggable (SFP+) transceiver, circuits and devices therefor, and method(s) of using the same.

DISCUSSION OF THE BACKGROUND

As a core component of optical (e.g., fiber-optic) communications networks, optical transceivers have provided optical data transmission systems with low cost, large capacity, and low power consumption. Such transceivers make fiber-optic networks more complete, smaller, and can increase access to the transceiver interface board. Such transceivers comprise optoelectronic component(s), functional circuitry, a laser and a photodiode-transimpedance amplifier (PIN-TIA), in which the optoelectronic component(s) include both transmitter and receiver circuitry. In some embodiments, the transmitter circuitry comprises a light-emitting diode (LED), a vertical-cavity surface-emitting laser (VCSEL), Fabry-Perot circuitry (FP), and/or distributed feedback (DFB) and electro-absorption modulated laser (EML) circuitry. Additionally, the receiver circuitry can comprise a p-type/intrinsic/n-type photodetector (e.g., a PIN photodiode) and/or an avalanche photodetector (APD).

Conventional high-capacity, long-range, high-speed transceivers utilize a cooled EML laser and laser driver. However, such lasers and drivers consume large amounts of power, thus making it difficult to reduce power consumption. Additionally, with the high power consumption required by temperature controllers available on today's market, such controllers are especially inefficient for cooling devices under low current conditions, thus increasing the power consumed by the entire transceiver. For example, in an SFP+ transceiver (which are transceivers configured to operate at speeds faster than those of SFP transceivers), in which an EML laser driver is utilized to drive an EML laser, the EML laser can consume large amounts of power.

In such a receiver, to ensure that the laser functions properly at any given temperature within a given temperature range, the temperature of the EML laser is set to a temperature (e.g., $T_{EML}$) within a given temperature range, and subsequently adjusted by cooling (if the laser is at a higher temperature) or heating (if the laser is at a lower temperature). The greater the temperature difference between $T_{EML}$ and the given temperature, the greater the cooling or heating required to obtain the temperature $T_{EML}$, and thus, the more power consumed.

Additionally, in certain conventional embodiments, a direct current (DC) from a MOS transistor (e.g., a MOSFET) is used as an input bias current to the EML laser, and a current-limiting resistor (which itself consumes power) is connected in series between the MOS and EML laser to limit current. Furthermore, even when a voltage is directly supplied, it can be difficult to reduce transceiver power consumption.

The technical solutions above are all causes of high power consumption related to conventional SFP and SFP+ transceivers (i.e., SFP transceivers capable of operating at high data rates), as well as other similar optical transceivers which may benefit from low power consumption solutions. The present invention overcomes the shortcomings of the conventional technology, and provides a long reach, low power consumption, pluggable transceiver configured to effectively reduce power consumption.

SUMMARY OF THE INVENTION

Embodiments of the present invention relate to a low power consumption, long range, pluggable (e.g., SFP+-compatible) transceiver comprising a photodiode with a transimpedance amplifier (PIN-TIA); an electro-absorption modulated (EML) laser; an optical detector; and a directly modulated laser (DML) driver circuit (which may be implemented as an integrated circuit) configured to drive the EML laser (e.g., for low extinction ratio applications) and/or an EML laser driver (which may also be implemented as an integrated circuit) configured to drive the EML laser (e.g., for large extinction ratio applications). In one embodiment, a low-power consumption DML laser driver circuit is used to drive the EML laser to reduce power consumption. Typically, the DML laser driver consumes about half of the power of the EML laser driver. Additionally, in some embodiments, an impedance matching circuit is used to modulate an electro-absorption (EA) modulator of the EML laser to maximize efficiency when the output impedance of the DML laser driver circuit does not match the input impedance of the EML laser. The DML laser driver circuit that drives the EML laser is controlled via a microcontroller that may be configured to adjust a cross point, control an output voltage amplitude and/or a pre-emphasis function, and/or accurately drive the EML laser (optionally, with maximum efficiency).

In another embodiment, and to further reduce power consumption, the present EML laser can be configured to apply a semi-cooling method and divide the working temperature of the EML laser into 2 or more ranges, where each temperature range or EML laser chip temperature profile (or group of settings) has a corresponding set or predetermined value or range of values based on ambient temperature or the transceiver module case temperature. Additionally, the present invention can include a micro-controller configured to (i) obtain a voltage of a thermal resistor in the EML laser via an analog-to-digital converter (ADC), (ii) detect an internal temperature of the EML laser, (iii) determine a corresponding operating temperature range for the EML laser, (iv) set a corresponding temperature value within the operating temperature range for the EML laser via a control circuit, and/or (v) limit the temperature of the EML laser within the operating temperature range via the (temperature) control circuit. The EML laser chip temperature settings or temperature profile consists of a constant temperature setting and/or a linear temperature relationship for a predetermined temperature range of the EML laser. In commercial applications, transceivers with EML lasers generally operate at a module case temperature in the range of −5° C. to 70° C. Thus, conventional transceivers' design requires heating at lower temperatures and cooling at higher temperatures, and conventional transceivers also always consume power since the EML laser chip temperature is set to a constant temperature regardless of the transceiver's operating temperature. For example, in such transceivers, a fixed temperature T is set for the laser within the operational temperature range of the transceiver, and the fixed temperature T is maintained by cooling the EML laser when the EML laser is at a higher operating temperature and heating the laser when it is at a lower operating temperature.

The greater the temperature difference, the greater the cooling or heating required to reach the fixed temperature T, and the more power consumed in doing so.

In the present invention, the laser semi-cooling method has been utilized to adjust and/or tune the laser chip temperature setting range to minimize power consumption. For example, a first temperature (e.g., T1), a second temperature (e.g., T2), and a third temperature (T3) can be utilized, wherein T2 is the normal (standard operating) temperature, T1 is a lower temperature, and T3 is a higher temperature. When utilizing several temperatures, the laser may function at temperature T1 when the operating temperature decreases, and at temperature T3 when the operating temperature increases, thereby reducing temperature variations and differences, and reducing power consumption accordingly. That is, temperature ranges are set using corresponding target temperatures closer to the actual operating temperature, so as to reduce the amplitude of temperature adjustment (if necessary), thereby reducing power consumption. By utilizing temperatures T1, T2 and T3, different temperature profiles can be utilized, such as a linear curve or an exponential curve for the temperature fluctuations between temperatures T1 and T2, temperatures T2 and T3, etc.

To ensure the EML laser functions at a set operating temperature, a thermoelectric cooler (TEC) control circuit can be utilized. Currently, there are several TEC control ICs commercially available, but these ICs are designed for supplying a relatively large TEC current. For example, for low power consumption applications (e.g., SFP+ transceivers), the efficiency of these TEC control ICs is about 20%. However, the present disclosure includes one or more DC/DC converters (or other similar voltage controlled current sources) coupled to a TEC control circuit that can be configured for different applications. For example, in certain exemplary applications utilizing an SFP+ transceiver, the TEC control circuit can include one or more DC/DC converters to achieve greater than 90% efficiency. The DC/DC converter-based TEC control circuit is controlled by a proportional-integral-derivative (PID) algorithm that is used to automatically adjust the operating temperature. Using an auto-control principle, a PID control loop feeds back the operating temperature obtained (e.g., measured) from the EML laser to a microcontroller. The microcontroller then compares the actual operating temperature with a preset target temperature and, to ensure that the two temperatures are equal, makes an adjustment (if necessary) via a temperature control circuit. The temperature control circuit controls the cooling and heating of the EML laser (e.g., through a heat transfer device) according to an output of the microcontroller, so as to approach the fixed (preset or target operating) temperature, and maintain the preset/target operational temperature. In one embodiment, to control the cooling and heating current, dual DC/DC converters can be used for simultaneously sourcing and sinking the current through microcontroller.

In the present invention, a pulse-width modulation (PWM) bias current is utilized to generate a current that can be used to provide an input bias current for the EML laser. Specifically, an output of a microcontroller or microprocessor controls a direct-current/direct-current (DC/DC) converter in the PWM bias circuit, which provides one or more output signals having various duty ratios. The output signals are then processed by a filter circuit to provide the bias current to the EML laser.

In the present invention, a low power requirement DC/DC converter may be used to directly provide an accurate, continuous current supply to the EML laser. The DC/DC converter has high efficiency as a current source for laser bias current. Compared to existing technology, the present long reach transceiver has a low-power requirement and is able to reduce power consumption and increase transceiver efficiency (precision). These and other advantages of the present invention will become readily apparent from the detailed description of various embodiments below.

DETAILED DESCRIPTION

Reference will now be made in detail to various embodiments of the invention, examples of which are illustrated in the accompanying drawing(s). In order to achieve the objectives, technical solutions and advantages of the present invention more clearly, further details of the invention are described below with regard to the Figure(s). While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. The embodiments described here are only used to explain, rather than limit, the invention.

Figure 1:
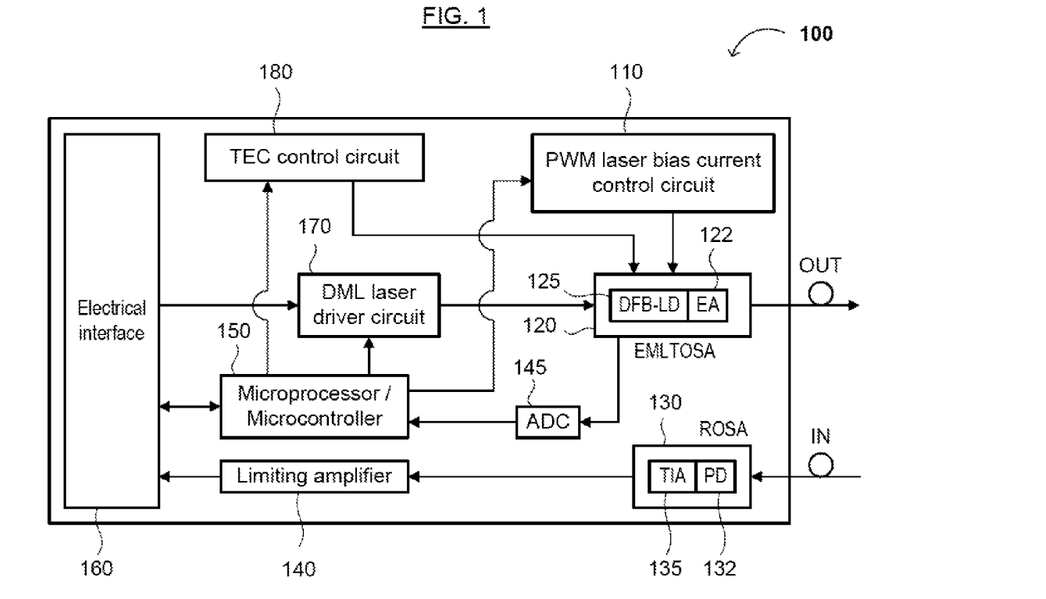
FIG. 1 is a diagram showing an exemplary transceiver according to the present invention.

For the sake of convenience and simplicity, the terms "connected to," "coupled with," "coupled to," and "in communication with" (which terms also refer to direct and/or indirect relationships between the connected, coupled and/or communicating elements unless the context of the term's use unambiguously indicates otherwise) are generally used interchangeably herein, but are generally given their art-recognized meanings FIG. 1 illustrates an exemplary embodiment of a low power consumption, long-range transceiver (e.g., a SFP+ transceiver) 100 comprising a receiver optical sub assembly (ROSA) 130. ROSA 130 comprises a transimpedance amplifier (TIA) 135 and a photodiode (PD) (e.g., a p-type intrinsic n-type [PIN] photodiode) 132. ROSA 130 (e.g., also referred to as PIN-TIA 130) is configured to receive an optical input signal IN (e.g., from the optical signal medium such as a fiber optic cable) and provide an electrical output signal to limiting amplifier 140. Limiting amplifier 140, in communication with electrical interface 160, is configured to limit the voltage of the input signal, and provide an amplified output signal to electrical interface 160. Electrical interface 160 is coupled to a microprocessor 150 via one or more buses, and provides one or more signals (e.g., from an electrical component in communication with transceiver 100) to microprocessor 150. Microcontroller 150 is configured to control and/or regulate various functions of the transceiver modules (e.g., thermoelectric cooler [TEC] control circuit 180, directly modulated laser [DML] driver circuit [module] 170, TWM laser bias current control circuit 110, etc.).

Transceiver 100 also comprises an electro-absorption modulated laser transmitter optical subassembly (EML TOSA) 120. EML TOSA 120 comprises a distributed feedback laser diode (DFB-LD) 125 and an electro-absorption (EA) modulator 122. EML laser 120 provides an optical output signal OUT.

Furthermore, transceiver 100 comprises a PWM bias current control circuit 110, which is used for laser bias current generation with low-power consumption. The PWM bias current circuit is achieved through a DC/DC converter with high efficiency for desired laser bias current for EML laser 120. As shown, DML driver circuit 170 is connected between electrical interface 160 and EML laser 120. As illustrated, DML laser driver IC 170, rather than an EML laser driver IC, is used to drive the EML laser 120 so as to effectively reduce power consumption.

Microprocessor/microcontroller 150 maintains a desired or predetermined optical output power (e.g., signal OUT provided by EML laser 120) by controlling the PWM laser bias current control circuit 110 which generates the laser bias current on the DFB-LD section 125 of the EML laser 120. The electrical data signal comes from electrical interface 160 and is amplified by DML laser driver circuit 170, wherein the amplification or modulation amplitude is controlled by microprocessor/microcontroller 150. The amplified electrical data signal is applied to EA modulator 122 of EML laser 120 to achieve the optical output signal OUT. Additionally, microcontroller 150 adjusts and maintains the eye diagram (e.g., the eye crossing point, extinction ratio, etc.) of the output optical signal OUT by controlling the DML laser driver circuit 170. Furthermore, temperature control of the EML laser 120 (e.g., DFB-LD section 125) is maintained through a TEC control closed feedback loop. Specifically, microcontroller 150 uses analog-to-digital converter (ADC) 145 to monitor the temperature of the EML laser 120 (e.g., the DFB-LD 125 of EML laser 120). Microcontroller 150 then processes (e.g., compares) the temperature data with a predetermined or desired temperature setting through a PID (Proportional-Integral-Derivative) algorithm to provide the temperature difference data (e.g., via the closed feedback loop) to TEC control circuit 180 and generate the TEC cooling or heating current for EML laser 120. Incoming optical data signal IN goes into ROSA 130, which converts the optical signal IN to an electrical signal, which enters the electrical interface 160 after amplification by limiting amplifier 140.

The present EML laser applies a semi-cooling method. Most optical transceivers operate within one of three temperature ranges, depending on the application and/or environment (e.g., commercial, extended, or industrial) in which they are used. In a first temperature range for commercial applications, optical transceivers generally should operate in a temperature range of from about −5° C. to about 70° C. Additionally, for extended applications, optical transceivers generally should operate in a second temperature range of from about −5° C. to about 85° C., and for industrial applications, optical transceivers generally should operate in a third temperature range of from about −40° C. to about 85° C. For example, in commercial applications, the present EML laser chip temperature can be configured to operate within a temperature range of about 25° C. to 60° C., such as 25° C. (e.g., T1), 45° C. (e.g., T2), and 55° C. (e.g., T3) based on different ambient temperature or transceiver case temperature determinations. The present laser chip temperature setting adjustments minimize the difference between the laser chip temperature and the ambient temperature, thereby minimizing TEC power consumption. The EML laser of the present invention may operate at 25° C. when the transceiver module case temperature is comparatively low (e.g., a temperature under 25° C.), at 35° C. when the transceiver module case temperature reaches a temperature between 25° C. and about 55° C., and at 45° C. when the transceiver module case temperature is comparatively high (e.g., a temperature above 55° C.). The laser chip temperature can be controlled (e.g., linearly increased or decreased) using the microcontroller between T1 and T3. By utilizing the present transceiver, temperature variations between the actual operating temperature and the preset (target) operating temperature are reduced, and less power is consumed in heating and cooling the EML laser.

Figure 2:
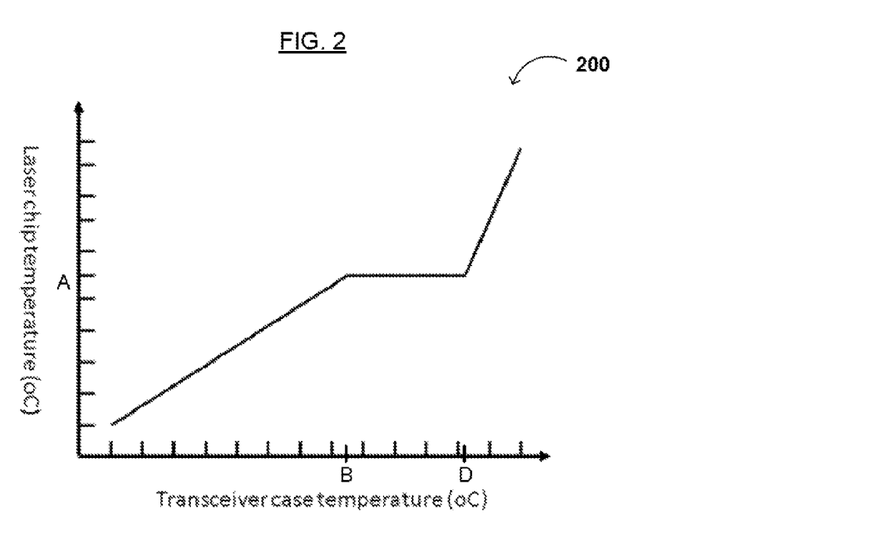
FIG. 2 shows a graph illustrating an exemplary laser chip temperature setting profile.

FIG. 2 shows an exemplary laser chip temperature setting profile under industry-standard operating temperature conditions. As shown in the graph 200 of FIG. 2, when the temperature of the transceiver (TRx) module case (shown in ° C.) increases to a transceiver case temperature B, the laser chip temperature (also shown in ° C.) is linearly increased by the microcontroller until reaching a temperature A. For a given operating range of TRx case temperatures (e.g., between temperatures B and D), the laser chip temperature remains at a constant value (e.g., temperature A). In some embodiments, the given range of TRx case temperatures where the laser chip temperature remains constant is from about between 35° C. to 75° C. Thus, the laser chip temperature can be tuned and/or adjusted by the microcontroller with respect to TRx case temperatures between temperature B and temperature D. Additionally, for TRx case temperatures greater than temperature D, the laser chip temperature can be adjusted by the microcontroller and increased linearly. Thus, with a higher TRx case temperature range, a smaller cooling current can be applied since the laser chip temperature setting increases as the TRx case temperature increases. Similarly, for TRx case temperatures less than temperature B, less heating current can be applied since the laser chip temperature setting decreases as the TRx case temperature decreases.

A PWM bias current control circuit 110 is utilized in the present invention to generate an input bias current for the EML laser 120. The PWM bias current control circuit 110 may comprise a DC/DC converter, a filter network, and optionally, a digital-to-analog converter (DAC; e.g., DAC 503 in FIG. 5) at an input of the DC/DC converter. An output signal of the microcontroller 110 controls the DC/DC converter of the PWM bias circuit 110, which provides output signals having different duty ratios (i.e., duty cycles) to the PWM bias circuit. The output signals are then processed by the filter network (circuit) to provide a bias current to the EML laser 120.

Figure 3A:
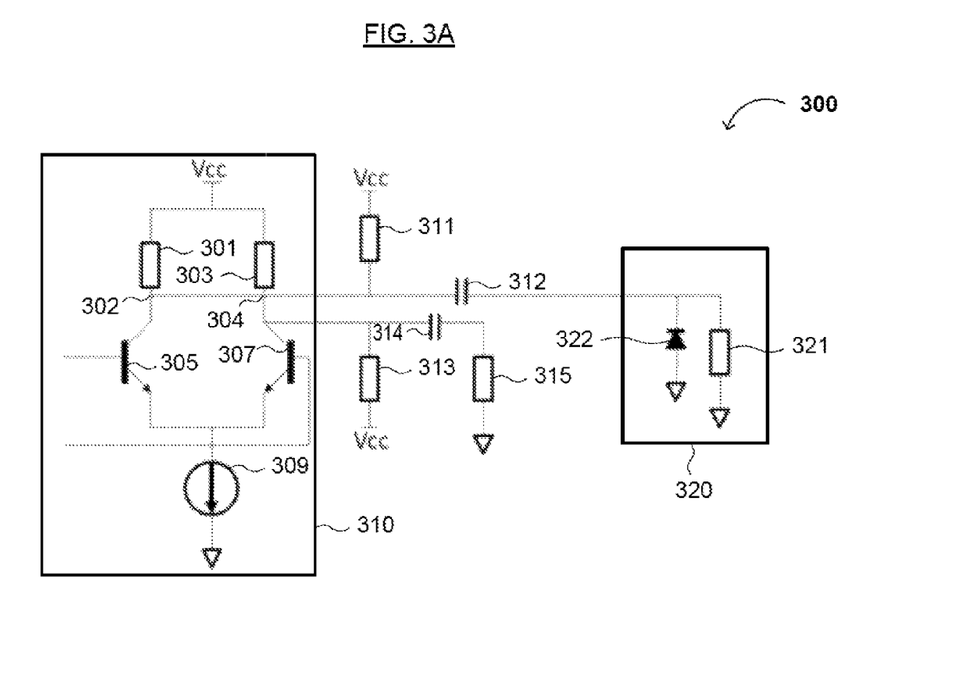
FIG. 3A shows a diagram illustrating a circuit 300 comprising a DML laser driver IC configured to drive an EML laser, wherein the input impedance of the EML laser matches the output impedance of the DML laser driver IC.

FIG. 3A illustrates an impedance matching circuit 300, by which the impedance of a DML laser driver 310 (e.g., DML laser driver circuit 170 in FIG. 1) and the EML laser 320 can be matched. For example, in one embodiment, the DML laser driver 310 in FIG. 3A (which can be implemented as an IC)

has a 25 ohm (Ω) output impedance, and the EML laser 320 has a 50 ohm (Ω) input impedance. However, the different impedances can be matched in the circuit 300. In embodiments using or requiring a large optical extinction ratio, an EML laser driver can be used instead of the DML laser driver 310, although power consumption generally increases. By matching the input impedance of the EML laser 320 with the output impedance of the DML laser driver 210, power transfer can be maximized and power consumption minimized.

As shown in circuit 300 of FIG. 3A, DML laser driver 310 is itself a biasing circuit. Specifically, DML laser driver 310 comprises resistances (e.g., resistors) 301 and 303, transistors 305 and 307, and current source 309. Resistance 301 is coupled to a voltage source (e.g., $V_{cc}$), and to the collector of a first transistor (e.g., BJT 305) of the DML laser driver 310 at node 302. Similarly, resistance 303 is coupled to the voltage source and to the collector of a second transistor (e.g., BJT 307) of the DML laser driver 310 at node 304. As shown, current source 309 is coupled to the emitter of first transistor 305 and to the emitter of second transistor 307, as well as a ground potential (e.g., a potential of about 0V). In an alternative embodiment, first and second transistors 305 and 307 are MOSFETs. Additionally, in certain embodiments, resistances 301 and 303 have the same resistance value, as do resistances 311 and 313, although one or both of these pairs of resistances can have different values. Additionally, first transistor 305 is coupled to resistance 311 and capacitance (e.g., a capacitor) 312 at node 302. Resistance 311 is coupled to a first power supply (e.g., $V_{cc}$), and (along with resistance 301 and BJT 305) is intended to provide a predetermined impedance at node 302 that matches the impedance at the input of EML laser 320. Capacitance 312 is also coupled to EML laser 320. As shown, EML laser 320 comprises a resistance 321 and an EML laser diode 322.

Second transistor 307 is coupled to a resistance 313 and a capacitance 314 at node 304. Resistance 315, coupled to capacitance 314, is also coupled to a ground potential (e.g., a voltage source of about 0V). Resistance 313 is coupled to the first power supply (e.g., $V_{cc}$) and (along with resistance 303 and BJT 307) is intended to provide a predetermined impedance at node 304. The equivalent output impedance from laser driver 310 comprises resistors 301 and 311, and resistors 303 and 313. Thus, by optimizing the resistance of resistors 311 and 313, the output impedance from the laser driver can be matched to the input impedance of EML laser 320. Similarly, the conductive pathway (e.g., the bus, wire, transmission line, etc.) between laser driver 310 and EML laser 320 is designed to have an impedance value the same as or similar to that of the input impedance of EML laser 321.

Figure 3B:
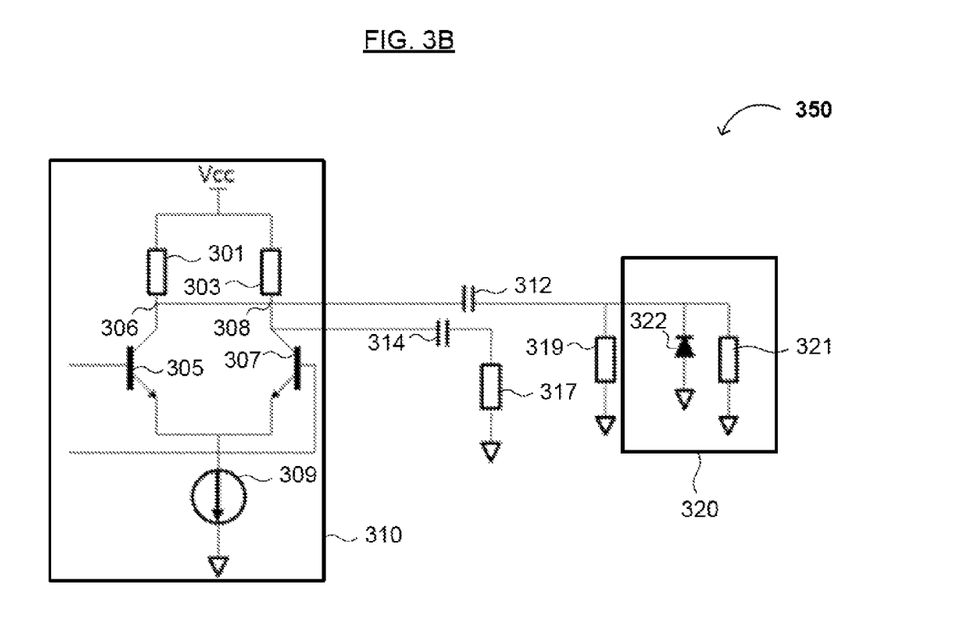
FIG. 3B shows a diagram illustrating a circuit 350 comprising a DML laser driver IC configured to drive an EML laser, wherein an impedance conversion circuit is used to match the output impedance of the DML laser driver IC to the input impedance of the EML laser.

As shown in FIG. 3B, an alternative circuit 350 is provided by which the output impedance of DML laser driver 310 is substantially matched to the input impedance of EML laser 320. As discussed above with respect to FIG. 3A, DML laser driver 310 comprises a biasing circuit, itself comprising resistances 301 and 303, transistors (e.g., bipolar junction transistors [BJTs]) 305 and 307, and current source 309. As shown, resistances 301 and 303 are coupled to a voltage source $V_{cc}$, and current source 309 is coupled to a ground potential (e.g., a voltage source of about 0V).

Similar to circuit 300 of FIG. 3A, DML laser driver 310 in FIG. 3B is coupled to capacitance (e.g., a capacitor) 312 at node 306, itself coupled to EML laser 320. Capacitance 312 is also coupled to a resistance 319, itself coupled to a ground potential (e.g., a voltage of about 0V). Furthermore, as discussed above, EML laser 320 comprises EML laser diode 322 and resistance 321 (e.g., arranged in a parallel circuit configuration). Although there may be different laser packaging configurations suitable for the present EML laser 320, in some embodiments, resistor 321 has a resistance value of about 50 ohms and is arranged in parallel with EML laser diode 322 (inside the EML laser 320). The input impedance of EML laser 320 may be about 50 ohms, which may be different from the output impedance of laser driver 310. Node 308 in DML laser driver 310 is coupled to a capacitance (e.g., a capacitor 314), which has its complementary plate coupled to relatively fixed potential (e.g., resistance 317 coupled to a ground terminal). The resistance of resistor 319 is configured to be similar to that of the EML laser 320, to configure the input impedance of EML laser 320 as desired. Thus, by optimizing the resistance of resistor 319, the equivalent input impedance of EML laser 320 can be matched to the output impedance of laser driver 310. Additionally, the impedance of the conductive pathway (e.g., transmission line) between EML laser 320 and laser driver 310 has an impedance value that is the same as or similar to that of the equivalent input impedance of EML laser 320.

Figure 4A:
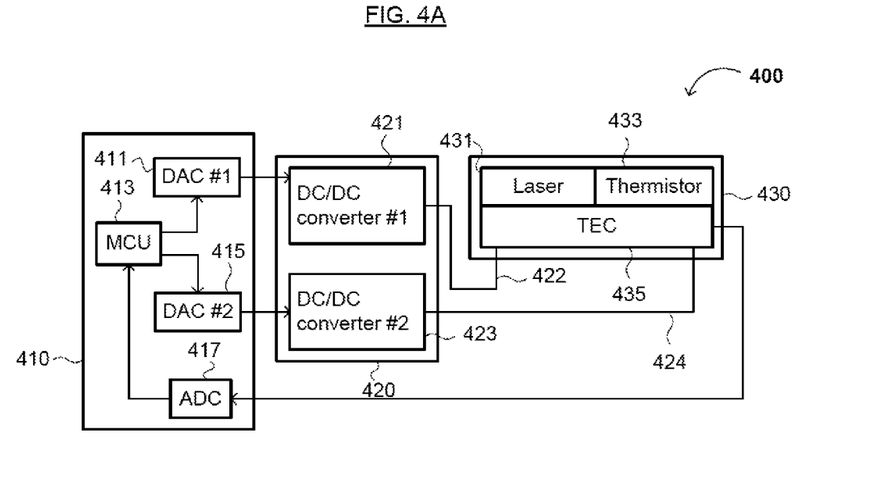
FIG. 4A illustrates a high-efficiency TEC control circuit 400 comprising dual DC/DC converters.

FIG. 4A shows a high-efficiency TEC control loop/circuit 400 that utilizes dual DC-DC converters. As shown, circuit 400 comprises microcontroller circuitry 410 comprising a first digital-to-analog converter (DAC) 411, a second digital-to-analog converter (DAC) 415, a microcontroller unit (MCU) 413, and an analog-to-digital converter (ADC) 417. As shown, first and second DACs 411 and 415 are configured by the MCU 413 to provide analog signals to control or regulate DC-DC converter block 420 such that a thermoelectric control (TEC) circuit 435 can control sourcing or sinking a current that heats or cools the EML laser (e.g., EML TOSA) 430.

Specifically, DC-DC converter block 420 is controlled by the DAC 415 and configured to source or sink a current that is used for TEC control (e.g., the current that is provided to TEC circuit 435). DC-DC converter 421 is configured to receive an analog DC signal (e.g., an analog control signal) from first DAC 411 and output a source current or a sink current (e.g., a TEC control current) for TEC control of the laser (e.g., EML TOSA) 430. Additionally, DC-DC converter 423 is configured to receive an analog DC signal (e.g., an analog control signal) from second DAC 415 and output a source current or a sink current that is provided to TEC circuit 435 such that TEC circuit 435 controls or regulates a temperature of the EML TOSA 430. Depending on whether the operating temperature of the laser chip 431 is to be increased or decreased, a cooling current or a heating current is provided to TEC circuit 435. Depending on the direction of the current flow provided by DC-DC converter block 420, either the heating current or the cooling current is provided. For example, when a current is provided that flows from DC/DC converter 421 (which sources the current) through the TEC circuit 435 and back to DC/DC converter 423 (which sinks the current), DC-DC converter block 420 provides a TEC cooling current. Additionally, when a current is provided that flows from DC/DC converter 423 (which sources the current) through the TEC and then back to DC/DC converter 421 (which sinks the current), DC-DC convert block 420 provides a TEC heating current. Regulation of the current flow is provided via MCU 413. That is, MCU 413 monitors and/or regulates the operating temperature of laser chip 431 by comparing the temperature of laser chip 431 to a predetermined laser chip temperature setting, and determining if a cooling current or a heating current is to be provided to the TEC circuit 435. For example, if MCU 413 determines that the operating temperature of laser chip 431 is too high and a cooling current should be applied, MCU 413 sends a signal (e.g., a control signal) to the DC/DC converter 421 to source the current flowing through TEC circuit 435 and also sends a signal (e.g., a control signal) to the DC/DC converter 423 to sink the current flowing through TEC 435 via first DAC 411 and second DAC 415, respectively.

As shown, circuit 400 comprises EML laser or EML TOSA 430, comprising laser chip 431, thermistor 433, and TEC circuit 435. Laser chip 431 may be implemented as a diode laser, on an integrated circuit (e.g., a stand-alone IC or integrated with one or more other functions of EML TOSA 430). Thermistor 433 is coupled to laser chip 431 such that a change in the temperature of laser chip 431 corresponds to a change in the resistance of thermistor 433. By utilizing such a configuration, the resistance of thermistor 433 correlates to the temperature of laser chip 431. In one example, an increase in the temperature of laser chip 431 correlates to an increase in the resistance of thermistor 433.

As shown, TEC circuit 435 provides an analog signal to ADC 417 indicative of a temperature of laser 431. ADC 417 converts the analog signal to a digital signal, which is then processed by MCU 413. Depending on whether the temperature of laser chip 431 is to be increased or decreased, MCU 413 provides a signal to either or both of first DAC 411 and second DAC 415. For example, when MCU 413 determines that the laser temperature is to be increased, MCU 413 may provide a signal to first DAC 411, which is then provided to first DC-DC converter 421, and subsequently to TEC 435 as temperature control signal 422, and when MCU 413 determines that the laser temperature is to be decreased, MCU 413 provides a signal to second DAC 415, which is then provided to second DC-DC converter 423, and subsequently to TEC 435 as temperature control signal 424. Alternatively, DC-DC converter block 420 can output a differential signal on bus 422/424 that increases or decreases the temperature of the laser 431 based on whether the voltage difference across bus 422/424 is positive or negative. As a result, by utilizing the present circuit 400, the laser temperature can be efficiently increased or decreased to minimize temperature-dependent performance fluctuations of the laser 431.

Figure 4B:
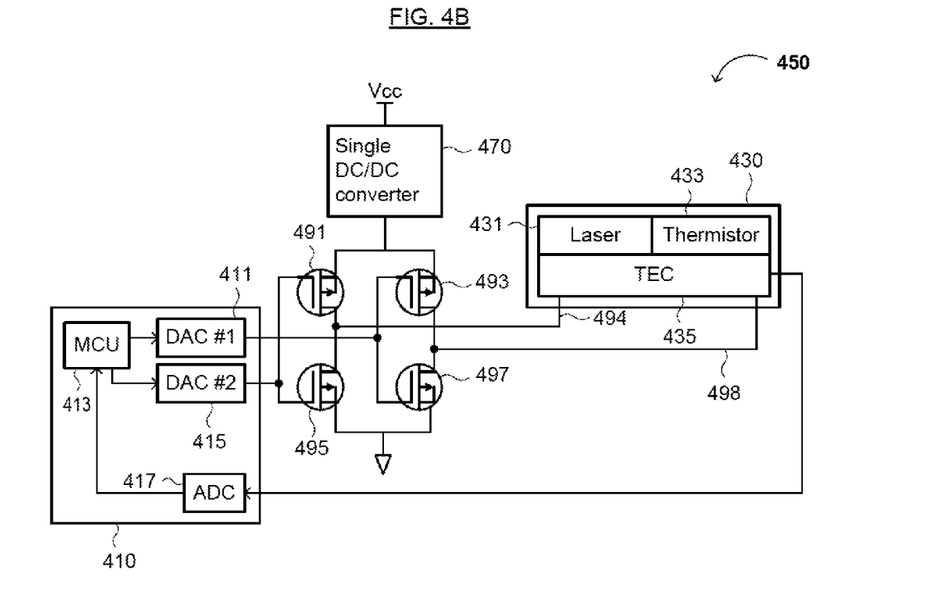
FIG. 4B illustrates a high-efficiency TEC control circuit 450 comprising one DC/DC converter with a switch to control the heating/cooling direction.

FIG. 4B illustrates a second exemplary TEC control loop or circuit 450 utilizing a single DC-DC converter 470. Circuit 450 comprises microcontroller circuitry 410 (as discussed above with respect to FIG. 4A), coupled to a plurality of transistors (e.g., MOSFETs) 491, 493, 495, and 497. As shown, MOSFETs 491 and 493 are p-channel, and MOSFETs 495 and 497 are n-channel. The source terminals of n-channel MOSFETS 495 and 497 are coupled to a ground potential (e.g., a potential of about 0V). Thus, MOSFETs 491, 493, 495 and 497 are configured as switches, controlled by the output of DAC 415 which can function to control the direction of current flow, and thus, provide TEC heating and cooling functions. Additionally, DC-DC converter 470 in FIG. 4B is configured to receive a first voltage (e.g., $V_{cc}$) and provide a second voltage to the source terminals of p-channel MOSFETs 491 and 493. The second voltage is one that is suitable for thermoelectric control of EML laser 430. Thus, the TEC control circuit 450 comprising DC-DC converter 470 and MOSFETs 491, 493, 495 and 497 can be a further example of the TEC control circuit shown in FIG. 1.

As discussed above with respect to FIG. 4A, EML laser 430 comprises TEC 435, laser 431, and thermistor 433, and is configured to provide an analog signal to ADC 417 indicative of a temperature of laser 431. ADC 417 converts the received analog signal to a digital signal, which is then processed by MCU 413. EML laser 430 and microcontroller 410 (including ADC 417) operate in the same way as FIG. 1 to effect or provide feedback to the TEC control circuit, depending on whether the temperature of laser 431 is to be increased or decreased, although the configuration of FIG. 4B is particularly advantageous when the outputs of DACs 411 and 415 provide a differential control signal (e.g., via signals 494 and 498) to TEC circuit 435.

Figure 5:
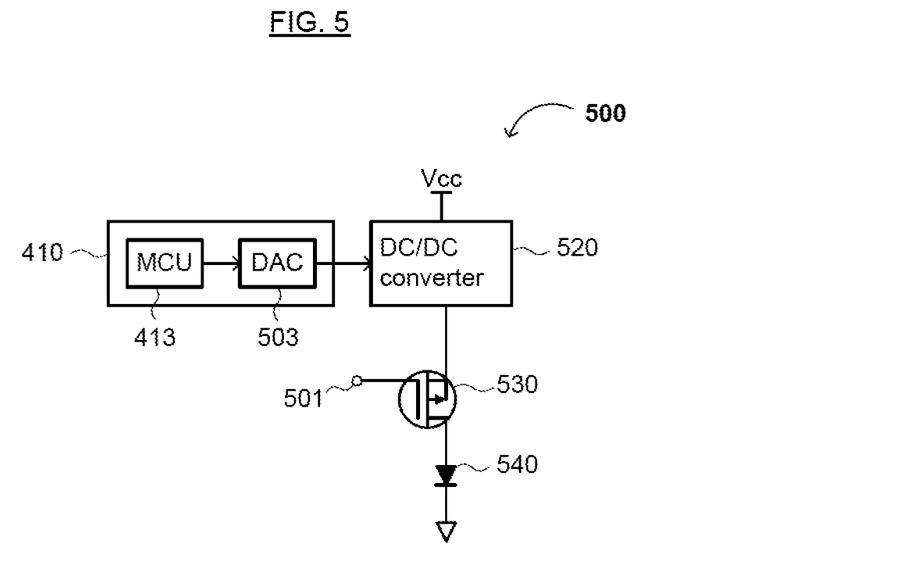
FIG. 5 illustrates a low power consumption laser bias current generation circuit 500 comprising a DC/DC converter.

FIG. 5 illustrates a low power consumption laser bias current generation circuit 500 comprising a DC-DC converter 520 (e.g., similar to DC-DC converter 470 in FIG. 4B). As shown in FIG. 5, the present bias current generation circuit comprises microcontroller circuitry 510, comprising MCU 413 (discussed above with respect to FIG. 4A) and digital-to-analog (DAC) 503 (e.g., similar to DAC 411 of FIGS. 4A-B). As shown, microcontroller circuitry 510 is configured to provide an analog signal to DC-DC converter 520, which receives a voltage $V_{cc}$ from an external voltage source (not shown). DC-DC converter 520 is configured to provide a DC signal to transistor (e.g., a p-channel MOSFET) 530. Transistor 530 is also configured to receive a transmitter enable signal at 501. For example, when enable signal has a first state (e.g., a voltage of about 0V), the drain terminal of transistor 530 provides the output of DC-DC converter 520 to the laser diode 540. However, when the enable signal has a second state (e.g., a voltage of about Vcc), the drain terminal of transistor 530 is at a high impedance state. Thus, the transmitter is not enabled when the enable signal has the second state.

CONCLUSION/SUMMARY

The present disclosure relates to an optoelectronic conversion device in an optical fiber communications and/or telecommunications systems and, more specifically, a long range pluggable transceiver configured to operate at a low power.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A transceiver comprising:
   a photodiode with a transimpedance amplifier;
   an electro-absorption modulated (EML) laser configured to operate at a working temperature in any of two or more temperature ranges, wherein each of the temperature ranges has a corresponding set value;
   a bias current control circuit configured to provide a bias current to the EML laser;
   a microcontroller or microprocessor configured to:
      determine an internal temperature of said EML laser;
      determine which of the two or more operating temperature ranges corresponds to said internal temperature of said EML laser;
      set a predetermined operating temperature value for said EML laser corresponding to said corresponding operating temperature range; and
      regulate or control said internal temperature of said EML laser based on a difference between said internal temperature of said EML laser and said predetermined operating temperature value; and a directly modulated laser (DML) driving module coupled between (i) said photodiode and transimpedance amplifier and (ii) said EML laser, said DML driving module configured to drive said EML laser.

2. The transceiver of claim 1, wherein said microcontroller or microprocessor is configured to utilize a proportional-integral-derivative (PID) control loop such that said EML laser operates at a predetermined temperature.

3. The transceiver of claim 1, further comprising a temperature control circuit configured to cool and/or heat said EML laser.

4. The transceiver of claim 1, wherein said EML laser comprises an electroabsorption (EA) modulator, and said transceiver further comprises an impedance matching circuit configured to regulate the EA modulator.

5. The transceiver of claim 1, wherein said bias current control circuit comprises a DC-DC converter and a filter network.

6. The transceiver of claim 1, wherein said microprocessor or microcontroller further obtains a voltage of a thermal resistor in the EML laser, and said transceiver further comprises an analog-to-digital converter (ADC) configured to provide a digital representation of said voltage to said microprocessor or microcontroller.

7. The transceiver of claim 1, wherein said microprocessor or microcontroller sets said corresponding temperature value for said EML laser, and said transceiver further comprises using a temperature control circuit configured to maintain said internal temperature of said EML laser.

8. The transceiver of claim 1, wherein a first one of said two or more operating temperature ranges is from about −40° C. to below 10° C., a second one of said two or more operating temperature ranges is from 10° C. to 30° C., and a third one of said two or more operating temperature ranges is from above 30° C. to about 85° C.

9. The transceiver of claim 8, wherein said corresponding temperature value is about 5° C. in said first range, said corresponding temperature value is about 20° C. in said second range, and said corresponding temperature value is about 40° C. in said third range.

10. A transmitter comprising:
   an electro-absorption modulated (EML) laser;
   a bias current control circuit configured to provide a bias current to the EML laser;
   a directly modulated laser (DML) driving module configured to drive said EML laser; and
   a microcontroller or microprocessor configured to:
      determine an internal temperature of said EML laser;
      determine which of two or more operating temperature ranges corresponds to said internal temperature of said EML laser;
      set a predetermined operating temperature value for said EML laser corresponding to said corresponding operating temperature range; and
      regulate or control said internal temperature of said EML laser based on a difference between said internal temperature of said EML laser and said predetermined operating temperature value.

11. The transmitter of claim 10, further comprising a temperature control circuit configured to cool and/or heat said EML laser such that said EML laser is substantially maintained at a predetermined temperature within one of said two or more operating temperature ranges, wherein said two or more operating temperature ranges are non-overlapping.

12. The transmitter of claim 10, wherein said bias current control circuit comprises a DC-DC converter and a filter network.

13. The transmitter of claim 10, wherein a first one of said two or more operating temperature ranges is from about −40° C. to below 10° C., a second one of said two or more operating temperature ranges is from 10° C. to 30° C., and a third range one of said two or more operating temperature ranges is from above 30° C. to about 85° C.

14. The transmitter of claim 13, wherein said corresponding temperature value is about 5° C. in said first range, said corresponding temperature value is about 20° C. in said second range, and said corresponding temperature value is about 40° C. in said third range.

15. A method of operating the an electro-absorption modulated (EML) laser in a transceiver, the method comprising:
   determining an internal temperature of said EML laser;
   determining which of two or more operating temperature ranges corresponds to said internal temperature of the EML laser;
   setting a predetermined operating temperature value for said EML laser corresponding to said corresponding operating temperature range; and
   regulating or controlling said internal temperature of said EML laser based on a difference between said internal temperature of said EML laser and said predetermined operating temperature value, wherein the transceiver further comprises:
   an electrical interface;
   a photodiode with a transimpedance amplifier;
   a bias current control circuit configured to provide a bias current to the EML laser; and
   a directly modulated laser (DML) driving module coupled between said electrical interface and said EML laser, said DML driving module configured to drive said EML laser.

16. The method of claim 15, wherein said method detects said internal temperature of said EML laser, and detecting said internal temperature of said EML laser comprises determining a voltage of a thermal resistor in said EML laser.

17. The method of claim 15, further comprising cooling said EML laser when said internal temperature is greater than said corresponding temperature value, and heating said EML laser when it is at a temperature lower than said corresponding temperature value.

18. The method of claim 15, wherein said corresponding operating temperature range comprises is one of a first range of from about −40° C. to below 10° C., a second range of from 10° C. to 30° C., and a third range of from above 30° C. to about 85° C.

19. The method of claim 18, wherein said corresponding temperature value is about 5° C. in said first range, said corresponding temperature value is about 20° C. in said second range, and said corresponding temperature value is about 40° C. in said third range.

20. The method of claim 15, further comprising controlling the bias current applied to internal temperature of said EML laser with a proportional-integral-derivative (PID) algorithm.

* * * * *